(12) United States Patent
Huang et al.

(10) Patent No.: US 11,909,566 B2
(45) Date of Patent: Feb. 20, 2024

(54) METHOD FOR DESIGNING COMPLEX-VALUED CHANNEL EQUALIZER

(71) Applicant: SOOCHOW UNIVERSITY, Suzhou (CN)

(72) Inventors: He Huang, Suzhou (CN); Yongliang Zhang, Suzhou (CN); Gangxiang Shen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 174 days.

(21) Appl. No.: 17/617,294

(22) PCT Filed: Jan. 28, 2021

(86) PCT No.: PCT/CN2021/074159
§ 371 (c)(1),
(2) Date: Dec. 7, 2021

(87) PCT Pub. No.: WO2022/105058
PCT Pub. Date: May 27, 2022

(65) Prior Publication Data
US 2023/0254187 A1 Aug. 10, 2023

(30) Foreign Application Priority Data
Nov. 20, 2020 (CN) .......................... 202011311308.X (51) Int. Cl.
*H04L 25/03* (2006.01)
(52) U.S. Cl.
CPC .............................. *H04L 25/03165* (2013.01)
(58) Field of Classification Search
CPC ................................................ H04L 25/03165
See application file for complete search history.

(56) References Cited

U.S. PATENT DOCUMENTS

2014/0376669 A1* 12/2014 Vaman .............. H04L 25/03165
375/343
2015/0161987 A1* 6/2015 Horesh ................... G10L 15/02
704/232

(Continued)

FOREIGN PATENT DOCUMENTS

| CN | 104486271 A | 4/2015 |
|---|---|---|
| CN | 109347555 A | 2/2019 |
| CN | 111950711 A | 11/2020 |

OTHER PUBLICATIONS

Zhang et al., The research of the complex-valued blind equalization algorithm based on the feedforward neural network Journal of Taiyuan University of Technology, vol. 37, No. 3, pp. 264-266 (May 20, 2006).

*Primary Examiner* — Jaison Joseph
(74) *Attorney, Agent, or Firm* — SZDC Law PC (57) ABSTRACT

The present invention discloses a method for the design of complex-valued channel equalizer of digital communication systems, including: constructing a channel equalizer by using a complex-valued neural network; collecting the output signal $y(n)=[y(n), y(n-1), \ldots, y(n-m+1)]^T$ of the nonlinear channel of the underlying digital communication system as the input of complex-valued neural network and $s(n-\tau)$ as the desired output, and taking the mean squared error as the loss function for the training of complex-valued neural network, which is optimized by the proposed adaptive complex-valued L-BFGS algorithm, and finally using it to implement the design of channel equalizer for digital communication systems. The present invention proposes the use of a multi-layer feedforward complex-valued neural network to construct complex-valued channel equalizer. A new adaptive complex-valued L-BFGS algorithm is proposed for efficient training of complex-valued neural net- (Continued)

work, which is eventually applied to facilitate the design of the channel equalizer for digital communication systems.

8 Claims, 5 Drawing Sheets

(56) References Cited

U.S. PATENT DOCUMENTS

| | | |
|---|---|---|
| 2015/0249554 A1 | 9/2015 | Vaman et al. |
| 2016/0248610 A1* | 8/2016 | Vaman ............... H04L 25/03159 |
| 2018/0260702 A1* | 9/2018 | Yamamoto ............. G06N 3/084 |
| 2019/0109736 A1* | 4/2019 | Yaman ............ H04B 10/07953 |
| 2020/0334542 A1* | 10/2020 | Hoydis ................... G06F 17/18 |
| 2022/0150094 A1* | 5/2022 | Nangare ........... H04L 25/03165 |

* cited by examiner

METHOD FOR DESIGNING COMPLEX-VALUED CHANNEL EQUALIZER

This application is the National Stage Application of PCT/CN2021/074159, filed on Jan. 28, 2021, which claims priority to Chinese Patent Application No. CN 202011311308.X, filed on Nov. 20, 2020, which is incorporated by reference for all purposes as if fully set forth herein.

FIELD OF THE INVENTION

The present invention relates to the fields of communication and artificial intelligence, and more particularly to a method for designing a complex-valued channel equalizer.

DESCRIPTION OF THE RELATED ART

In the field of signal processing, high-speed communication channels are often corrupted by inter-code crosstalk and external noise. Channel equalization is an effective anti-attenuation measure for resolving this problem. A channel equalizer recovers the transmitted signal through a channel by using the observed output signal from the underlying channel, thereby eliminates the inter-code crosstalk and noise interference. This is mainly to overcome the problem of inter-code crosstalk caused by multipath delay in broadband communication systems, and its basic principle is to compensate the characteristics of the channel or the transmission system.

SUMMARY OF THE INVENTION

A technical problem to be resolved by the present invention is to provide a method for designing a complex-valued channel equalizer. A multi-layer feedforward complex-valued neural network is used to construct a complex-valued channel equalizer, and an adaptive complex-valued L-BFGS algorithm is proposed for the efficient training of complex-valued neural networks, which is eventually used to implement channel equalization.

To resolve the foregoing technical problem, the present invention provides a method for designing a complex-valued channel equalizer, including:
constructing a complex-valued channel equalizer by using a complex-valued neural network, where the complex-valued channel equalizer is applied to a digital communication system; collecting an output signal $y(n)=[y(n), y(n-1), \ldots, y(n-m+1)]^T$ of a nonlinear channel of the digital communication system as an input of the complex-valued neural network and $s(n-\tau)$ as a desired output, and taking the mean squared error as the loss function $J(z,z^*)$ for the training of complex-valued neural network, and optimizing the loss function $J(z,z^*)$ to obtain an appropriate complex-valued neural network model, and finally using the complex-valued neural network to implement channel equalization.

In an embodiment, in the digital communication system, a complex-valued digital sequence of the nonlinear channel is denoted by $s(n)$, a channel order is h, a channel mapping is $f(\cdot)$, a noiseless channel output is $\hat{y}(n)$, an additive noise is $v(n)$, an actual channel output $y(n)$ is a superposition result of the noiseless channel output and the additive noise and is also taken as the input data of the equalizer, an equalizer order is m, and a decision delay of the equalizer is assumed to be $\tau$; a state ns of the channel is a data set generated by a limited character set transmitted through the channel, and a size of the data set is determined by the equalizer order and the channel order; a modulation order of a transmitted signal is M; and thus a transmission function of the channel is described by:

$$H(z) = \sum_{i=0}^{h} a_i z^{-i},$$

a quantity of state ns of the channel is determined by:
$ns = M^{h+m}$, in this case, an input sequence $s(n)=[s(n), \ldots, s(n-m+1-h)]^T$ has ns states, and after transmission through a noiseless channel, a desired channel output $\hat{y}(n)$ also has ns states; and the equalizer is used to reconstruct a sequence transmitted by a transmit end according to an observed channel output vector $y(n)=[y(n), y(n-1), \ldots, y(n-m+1)]^T$ with additive noise, herein $y(n)=[y(n), y(n-1), \ldots, y(n-m+1)]^T$ is a distortion signal with m delays, and m is the equalizer order.

In an embodiment, a specific method of "optimizing the loss function $J(z,z^*)$" is as follows: optimizing the loss function $J(z,z^*)$ by an adaptive complex-valued L-BFGS algorithm, calculating and comparing the approximation degree between the inverse of quasi-Newton matrix and the inverse of Hessian matrix along a particular vector, and selecting a memory size corresponding to the highest degree of approximation as the optimal memory size at the current iteration.

In an embodiment, a specific implementation process of "in the adaptive complex-valued L-BFGS algorithm, calculating and comparing the approximation degree between the inverse of quasi-Newton matrix and the inverse of Hessian matrix along a particular vector, and selecting a memory size corresponding to the highest degree of approximation as the optimal memory size at the current iteration" is as follows:

separately calculating $$\overset{c}{g}_t = \left[ 2\nabla_{z^*} J(z, z^*)^T, 2\nabla_z J(z, z^*)^T \right]^T,$$

$$\overset{c}{s}_t = \overset{c}{z}_t - \overset{c}{z}_{t-1}, \text{ and}$$

$$\overset{c}{y}_t = \overset{c}{g}_t - \overset{c}{g}_{t-1}$$

according to the loss function $J(z,z^*)$, where $$\overset{c}{z}_t = (z_t, z_t^*)^T;$$

respectively calculating $$\overset{c}{\gamma}_t = \overset{c}{s}_t - \frac{1}{3}\overset{c}{s}_{t-1} \text{ and } \overset{c}{\omega}_t = \overset{c}{y}_t - \frac{1}{3}\overset{c}{y}_{t-1}$$

in a multi-step quasi-Newton formula by using $$\overset{c}{s}_t \text{ and } \overset{c}{y}_t;$$

according to the formula:

$$\hat{H}_t^m = (V_{t-2}^H \cdots V_{t-m}^H)\hat{H}_t^{m0}(V_{t-m} \cdots V_{t-2}) + \\ \overset{c}{\rho}_{t-m}(V_{t-2}^H \cdots V_{t-m+1}^H)\overset{c}{\gamma}_{t-m}\overset{c^H}{\gamma}_{t-m}(V_{t-m+1} \cdots V_{t-2}) + \\ \overset{c}{\rho}_{t-m+1}(V_{t-2}^H \cdots V_{t-m+2}^H)\overset{c}{\gamma}_{t-m+1}\overset{c^H}{\gamma}_{t-m+1}(V_{t-m+2} \cdots V_{t-2}),$$

calculating a matrix $\hat{H}_t^m$, where the matrix is used for depicting the approximation degree between the inverse of quasi-Newton matrix and the inverse of Hessian matrix; herein, the superscript H denotes conjugate transpose, $$\overset{c}{\rho}_t = 1/\left(\overset{c^H}{\omega}_t\overset{c}{\gamma}_t\right)$$

$$V_t = I - \overset{c}{\rho}_t\overset{c}{\omega}_t\overset{c}{\gamma}_t, \text{ and}$$

$$\hat{H}_t^{m0} = \frac{\overset{c^H}{\omega}_{t-1}\overset{c}{\gamma}_{t-1}}{\overset{c^H}{\omega}_{t-1}\overset{c}{\omega}_{t-1}};$$

given an upper bound M of memory size, calculating the approximation degree between $\hat{H}_t^m$ and the inverse of Hessian matrix for m=1, 2, ..., M according to a formula $$e_m = \left(\hat{H}_t^m \overset{c}{\omega}_t - \overset{c}{\gamma}_t\right)^H \left(\hat{H}_t^m \overset{c}{\omega}_t - \overset{c}{\gamma}_t\right);$$

based on the foregoing calculated $e_m$, selecting a corresponding value of m achieving the minimum $e_m$ as the optimal memory size m* of the complex-valued L-BFGS algorithm;

when the optimal memory size is determined, calculating a search direction at the current iteration with the help of:

$$\hat{H}_t = (V_{t-1}^H \cdots V_{t-m}^H)\hat{H}_t^0(V_{t-m} \cdots V_{t-1}) + \\ \overset{c}{\rho}_{t-m}(V_{t-1}^H \cdots V_{t-m+1}^H)\overset{c}{s}_{t-m}\overset{c^H}{s}_{t-m}(V_{t-m+1} \cdots V_{t-1}) + \\ \overset{c}{\rho}_{t-m+1}(V_{t-1}^H \cdots V_{t-m+2}^H)\overset{c}{s}_{t-m+1}\overset{c^H}{s}_{t-m+1}(V_{t-m+2} \cdots V_{t-1}) + \cdots + \overset{c}{\rho}_{t-1}\overset{c}{s}_{t-1}\overset{c^H}{s}_{t-1},$$

calculating a search direction by $$\overset{c^T}{p}_t = -\hat{H}_t\overset{c}{g}_t;$$

and then, using a line search condition:

$$J(\overset{c}{z}_t + \alpha_t\overset{c}{p}_t) \leq J(\overset{c}{z}_t) + k_1\alpha_t\overset{c^T}{p}_t\frac{\partial J(\overset{c}{z}_t)}{\partial \overset{c}{z}_t},$$

$$\overset{c^T}{p}_t\frac{\partial J(\overset{c}{z}_t + \alpha_t\overset{c}{p}_t)}{\partial \overset{c}{z}_t} \geq k_2\overset{c^T}{p}_t\frac{\partial J(\overset{c}{z}_t)}{\partial \overset{c}{z}_t}$$

calculating a step size, where $k_1$ takes value from the interval (0, 0.5), and $k_2$ takes value from the interval $(k_1, 1)$, to obtain a parameter update formula as $$\overset{c}{z}_t = \overset{c}{z}_{t-1} + \alpha_t\overset{c^T}{p}_t.$$

In an embodiment, a specific process of "appropriately adjusting the value of M according to a change trend of the optimal memory size in several previous iterations" is:

given a window size W, calculating a predicted value $m_{f,t}^*$ of the memory size at the current iteration according to a formula $$m_{f,t}^* = \frac{m_{t-W}^* + m_{t-W+1}^* + \cdots + m_{t-1}^*}{W},$$

where $m_t^*$ denotes the optimal memory size at iteration t; and given constants $c_1$ and $c_2$, if $m_{f,t}^* < c_1 M$, M=M−1; if $m_{f,t}^* > (1-c_2)M$, M=M+1; or otherwise, M is kept unchanged.

In an embodiment, a new search direction is designed by superimposing a plurality of directions, at the $t^{th}$ iteration, a plurality of memory sizes can be selected, so that a plurality of directions are calculated, and then these directions are superimposed to obtain the search direction at the current iteration:

In an embodiment, a specific process "a new search direction is designed by superimposing a plurality of directions, at the $t^{th}$ iteration, a plurality of memory sizes can be selected, so that a plurality of directions are calculated, and then these directions are superimposed to obtain the search direction at the current iteration" is:

given a positive integer K, calculating an average memory size $$\overline{m}_w = \frac{m_{w1}^* + m_{w2}^* + \cdots + m_{wK}^*}{K}$$

according to K memory sizes $m_{w1}^*, m_{w2}^*, \ldots, m_{wK}^*$ selected at the $w^{th}$ iteration calculating the predicted value $$m_{f,t}^* = \frac{\overline{m}_{t-W} + \overline{m}_{t-W+1} + \cdots + \overline{m}_{t-1}}{W}$$

of the memory size at the current iteration by using an average value $\overline{m}_w$ (w=t−W, t−W+1, ..., t−1) of memory sizes in the previous W iterations;

adjusting M according to the predicted value by using the foregoing adaptive adjustment method; and calculating K memory sizes at the $t^{th}$ iteration according to the modified M, to obtain K directions, and then superimposing these directions to obtain the search direction at the current iteration.

Based on the same inventive concept, the present application further provides a computer device, including a memory, a processor, and a computer program stored in the memory and configured to be executed by the processor, where the processor is configured to execute the program to implement the steps in any foregoing method.

Based on the same inventive concept, the present application further provides a computer-readable storage medium, on which a computer program is stored, where a processor is configured to execute the program to implement the steps in any foregoing method.

Based on the same inventive concept, the present application further provides a processor, configured to execute a program, where the program is executed to implement any foregoing method.

The beneficial effects of the present invention are as follows:

The present invention constructs a complex-valued channel equalizer using a multi-layer feedforward complex-valued neural network, and designs a novel adaptive complex-valued L-BFGS algorithm for the efficient training of complex-valued neural networks, which is eventually applied for the implementation of a channel equalizer for digit communication systems. For the designed feedforward complex-valued neural network, $$\overset{c}{g}_t, \overset{c}{s}_t, \overset{c}{y}_t, \overset{c}{\gamma}_t, \text{ and } \overset{c}{\omega}_t$$

are first calculated by using the forward propagation and backward propagation, appropriate M and the optimal memory size m* are obtained by using the foregoing method, the adjustment amounts of the weights between neurons of different layers and the bias of neurons of the feedforward complex-valued neural network are calculated through Wirtinger calculus, the step size is obtained by using a line search method, and efficient training of the multi-layer feedforward complex-valued neural network is finally achieved, which can be effectively applied for the design of complex-valued channel equalizer for digital communication systems.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

In practice, artificial neural networks provide a promising method for implementing an equalizer. Especially, complex-valued neural networks are efficient for the design of complex-valued channel equalizer. Complex-valued neural networks have attracted much attention from scholars because of fast learning and the capability of directly processing complex signal. During the past few years, increasing research has been conducted for complex-valued neural networks. In some application fields such as image processing and complex signal processing, it has been proved that complex-valued neural networks outperform real-valued neural networks with the same structure in many aspects.

For a complex-valued neural network, complex gradient-type algorithms and complex Newton-type algorithms are the popular training algorithms at present. Complex gradient descent algorithms are widely applied due to their low computational complexity. However, the presence of a large number of saddle points in the objective function makes the training of complex-valued neural networks more difficult when the gradient-type algorithms are adopted. To resolve this problem, some improved algorithms are proposed. For example, one can adopt complex step size to change the search direction such that the training algorithm has the capability of escaping from a saddle point. In addition to the use of complex step size, other complex gradient algorithms are also established. For example, complex conjugate gradient algorithm can significantly overcome the impact of saddle points on the training. Compared with gradient-type algorithms, Newton-type algorithms can usually obtain faster convergence and higher accuracy. In the Newton method, the inverse of Hessian matrix needs to be calculated, which causes high computational complexity. To resolve this problem, the quasi-Newton method is provided. In the quasi-Newton method, the inverse of Hessian matrix is calculated in an approximation manner, thereby greatly reducing the calculation resource. The relatively common quasi-Newton method is the so-called BFGS algorithm. Because a large-scale matrix needs to be stored, the BFGS algorithm still has very high memory consumption during the implementation process. In the improved L-BFGS algorithm, it is only necessary to save limited information of a group of vector pairs, which greatly reduces the memory requirement, and thus enhances the practicability of the quasi-Newton algorithm.

Complex-valued L-BFGS algorithm is an optimization algorithm in the complex domain and can be used for solving unconstrained optimization problems with complex variables. It has been found that the memory size significantly affects the performance of complex-valued L-BFGS algorithm. Experiments have shown that the selection of an excessively large or small memory size cannot ensure better performance for complex-valued L-BFGS algorithm. Therefore, the present invention provides an adaptive memory size adjustment strategy for complex-valued L-BFGS algorithm and is applied for the design of complex-valued channel equalizer, so that the optimal memory size can be found at each iteration. This eventually guarantees the design of high-performance complex-valued channel equalizer and effectively reduces the computational complexity of the designed method.

Figure 1:
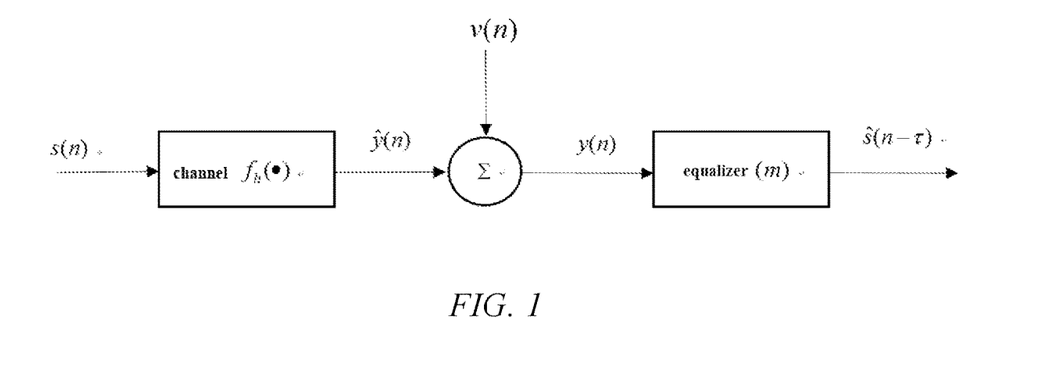
FIG. 1 is the schematic diagram of a digital communication model in which a complex-valued channel equalizer is designed according to the present invention.

A specific solution of the present inventions is as follows:

A complex-valued equalizer is first constructed by using a complex-valued neural network. The complex-valued equalizer is applied to a digital communication system model. To further understand the channel equalization, a complete digital communication system described in the present invention is given in FIG. 1, where s(n) is the complex-valued digital sequence, h is a channel order, f(•) is a channel mapping, ŷ(n) is a noiseless channel output, v(n) is an additive noise, y(n) is the actual channel output, (i.e., a superposition result of the noiseless channel output and the additive noise) and is taken as the input data of the equalizer, m is the equalizer order, and T is a decision delay of the equalizer. A state ns of the channel is a data set generated by a limited character set transmitted through the channel, and a size of the data set is usually determined by the equalizer order and the channel order. Assuming that a transmitted signal is s(n), the equalizer order is m, the channel order is h, and a modulation order of the transmitted signal is M. If a transmission channel is a 4QAM signal, the modulation order is M=4. A transmission function of the channel is described by:

$$H(z) = \sum_{i=0}^{h} a_i z^{-i}.$$

A quantity of the states ns of the channel is determined by: $ns = M^{h+m}$.

In this case, an input sequence $s(n)=[s(n), \ldots, s(n-m+1-h)]^T$ has ns states, after transmission through a noiseless channel, a desired channel output $\hat{y}(n)$ also has ns states.

The equalizer is used to reconstruct a sequence transmitted by a transmit end according to the observed channel output vector $y(n)=[y(n), y(n-1), \ldots, y(n-m+1)]^T$ with additive noise. $y(n)=[y(n), y(n-1), \ldots, y(n-m+1)]^T$ is a distortion signal with m delays, and m is the equalizer order.

Figure 2:
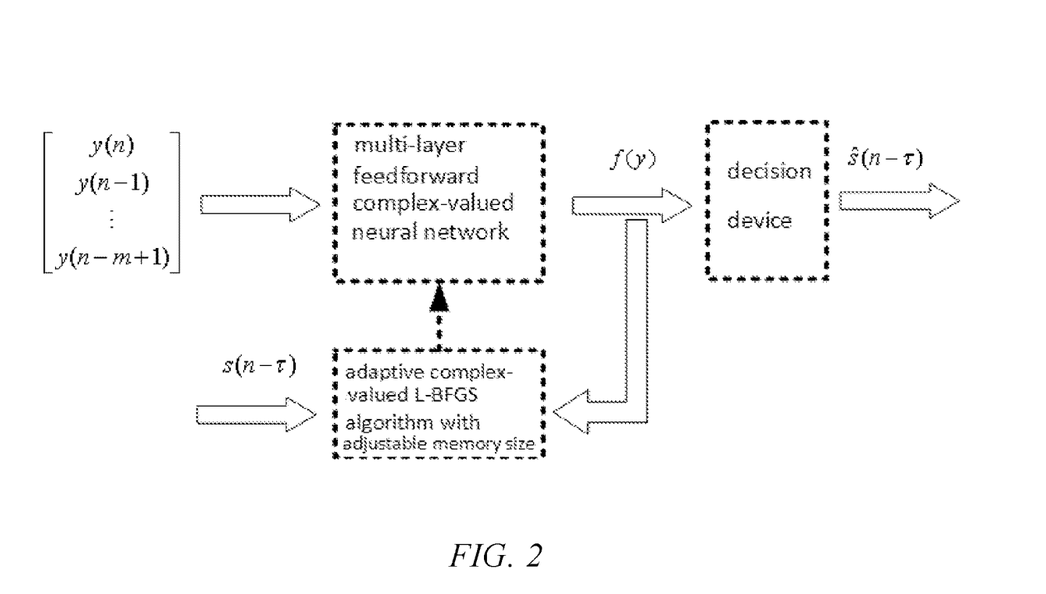
FIG. 2 is the schematic diagram of the structural framework of the complex-valued channel equalizer designed by the present invention.

Then an adaptive memory size adjustment method of complex-valued L-BFGS algorithm is provided, and is used for implementing efficient learning of multi-layer feedforward complex-valued neural networks, thereby greatly improving the performance of the complex-valued equalizer. The output signal $y(n)=[y(n), y(n-1), \ldots, y(n-m+1)]^T$ of the nonlinear channel is collected as the input of complex-valued neural network and $s(n-\tau)$ is acquired as the desired output, and a loss function $J(z,z^*)$ is constructed by using a mean squared error. The loss function $J(z,z^*)$ is optimized by using the complex-valued L-BFGS algorithm with the adaptive memory size adjustment to obtain an appropriate complex-valued neural network, and channel equalization is finally implemented by using the complex-valued neural network. The overall block diagram of the method is shown in FIG. 2.

Figure 3:
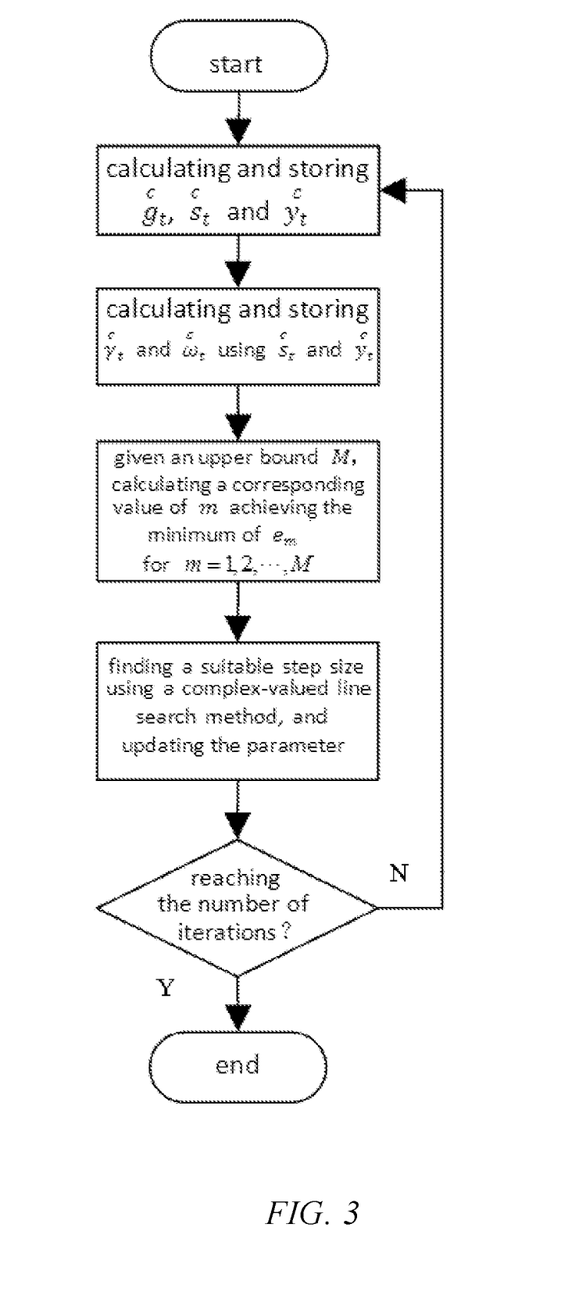
FIG. 3 is the flowchart of the training algorithm for a complex-valued neural network used for the design of channel equalizer according to the present invention.

In the adaptive complex-valued L-BFGS algorithm, the approximation degree between the inverse of quasi-Newton matrix and the inverse of real Hessian matrix along a particular vector is calculated and compared, and a memory size corresponding to the highest degree of approximation is selected as the optimal memory size at the current iteration. A specific implementation process of the algorithm is as follows:

$$\overset{c}{g}_t = \left[ 2\nabla_{z^*} J(z, z^*)^T, 2\nabla_z J(z, z^*)^T \right]^T,$$

$$\overset{c}{s}_t = \overset{c}{z}_t - \overset{c}{z}_{t-1} \text{ and } \overset{c}{y}_t = \overset{c}{g}_t - \overset{c}{g}_{t-1}$$

are separately calculated according to the loss function $J(z, z^*)$, where $$\overset{c}{z}_t = (z_t, z_t^*)^T; \overset{c}{\gamma}_t = \overset{c}{s}_t - \frac{1}{3}\overset{c}{s}_{t-1} \text{ and } \overset{c}{\omega}_t = \overset{c}{y}_t - \frac{1}{3}\overset{c}{y}_{t-1}$$

in a multi-step quasi-Newton formula are respectively calculated by using $$\overset{c}{s}_t \text{ and } \overset{c}{y}_t;$$

according to the formula:

$$\hat{H}_t^m = (V_{t-2}^H \cdots V_{t-m}^H)\hat{H}_t^{m0}(V_{t-m} \cdots V_{t-2}) +$$
$$\overset{c}{\rho}_{t-m}(V_{t-2}^H \cdots V_{t-m+1}^H)\overset{c}{\gamma}_{t-m}\overset{cH}{\gamma}_{t-m}(V_{t-m+1} \cdots V_{t-2}) +$$
$$\overset{c}{\rho}_{t-m+1}(V_{t-2}^H \cdots V_{t-m+2}^H)\overset{c}{\gamma}_{t-m+1}\overset{cH}{\gamma}_{t-m+1}(V_{t-m+2} \cdots V_{t-2});$$

a matrix $\hat{H}_t^m$ is calculated, where the matrix is used for depicting the degree of approximation between the inverse of quasi-Newton matrix and the inverse of Hessian matrix; herein, the superscript H denotes conjugate transpose, $$\overset{c}{\rho}_t = 1/\left(\overset{cH}{\omega}_t \overset{c}{\gamma}_t\right)$$

$$V_t = I - \overset{c}{\rho}_t \overset{c}{\omega}_t \overset{c}{\gamma}_t, \text{ and}$$

$$\hat{H}_t^{m0} = \frac{\overset{cH}{\omega}_{t-1}\overset{c}{\gamma}_{t-1}}{\overset{cH}{\omega}_{t-1}\overset{c}{\omega}_{t-1}}.$$

given an upper bound M, the approximation degree between $\hat{H}_t^m$ and the inverse of Hessian matrix is calculated for m=1, 2, ..., M according to a formula $$e_m = \left(\hat{H}_t^m \overset{c}{\omega}_t - \overset{c}{\gamma}_t\right)^H \left(\hat{H}_t^m \overset{c}{\omega}_t - \overset{c}{\gamma}_t\right);$$

according to the foregoing calculated $e_m$, a corresponding value of m achieving the minimum of $e_m$ is chosen as the optimal memory size m* of the complex-valued L-BFGS algorithm.

when the optimal memory size is determined, a search direction at the current iteration is calculated with the help of:

$$\hat{H}_t = (V_{t-1}^H \cdots V_{t-m}^H)\hat{H}_t^0(V_{t-m} \cdots V_{t-1}) +$$
$$\overset{c}{\rho}_{t-m}(V_{t-1}^H \cdots V_{t-m+1}^H)\overset{c}{s}_{t-m}\overset{cH}{s}_{t-m}(V_{t-m+1} \cdots V_{t-1}) +$$
$$\overset{c}{\rho}_{t-m+1}(V_{t-1}^H \cdots V_{t-m+2}^H)\overset{c}{s}_{t-m+1}\overset{cH}{s}_{t-m+1}(V_{t-m+2} \cdots V_{t-1}) + \cdots + \overset{c}{\rho}_{t-1}\overset{c}{s}_{t-1}\overset{cH}{s}_{t-1}$$

a search direction $$\overset{cT}{p}_t = -\hat{H}_t \overset{c}{g}_t$$

is calculated; and then, using a line search condition:

$$J\left(\overset{c}{z}_t + \alpha_t \overset{c}{p}_t\right) \le J\left(\overset{c}{z}_t\right) + k_1 \alpha_t \overset{cT}{p}_t \frac{\partial J\left(\overset{c}{z}_t\right)}{\partial \overset{c}{z}_t}$$

$$\overset{cT}{p}_t \frac{\partial J\left(\overset{c}{z}_t + \alpha_t \overset{c}{p}_t\right)}{\partial \overset{c}{z}_t} \ge k_2 \overset{cT}{p}_t \frac{\partial J\left(\overset{c}{z}_t\right)}{\partial \overset{c}{z}_t}$$

a step size is calculated, where $k_1$ takes value from the interval (0, 0.5), and $k_2$ takes value from the interval ($k_1$, 1), to obtain a parameter update formula $$\overset{c}{z}_t = \overset{c}{z}_{t-1} + \alpha_t \overset{c}{p}_t^T.$$

The flowchart is shown in FIG. 3.

Figure 4:
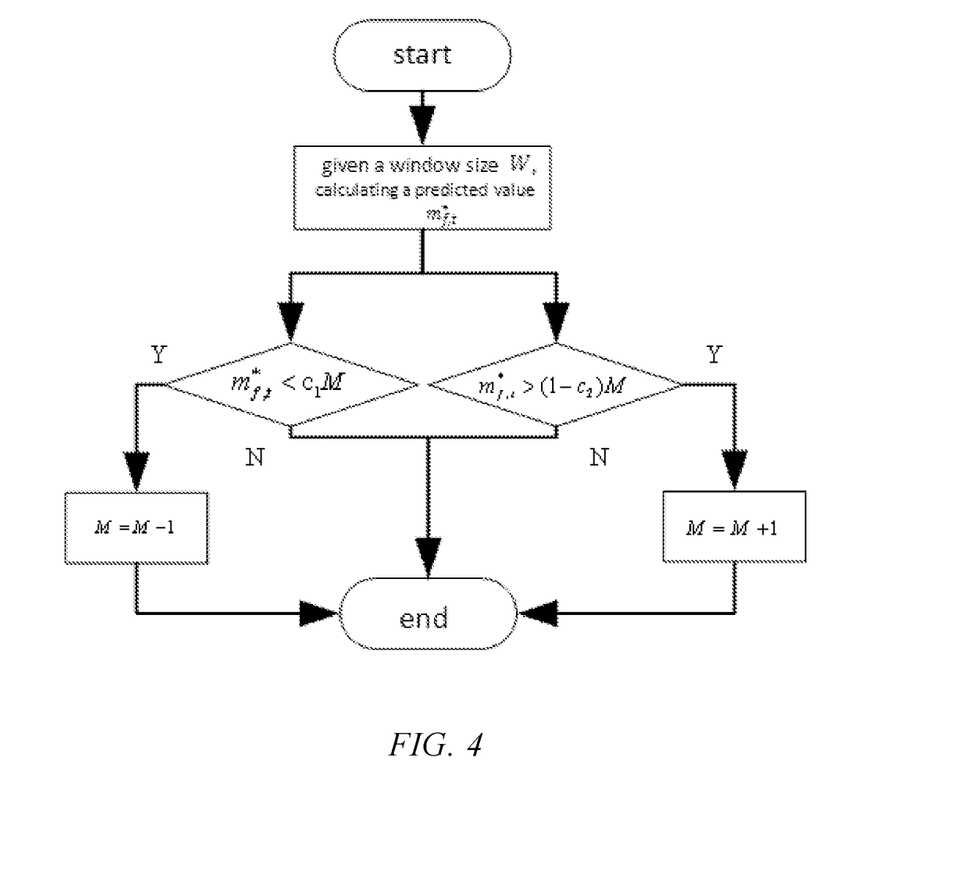
FIG. 4 is the flowchart of the adjustment of M in the method for designing a complex-valued channel equalizer according to the present invention.

To effectively reduce the computational complexity of the adaptive complex-valued L-BFGS algorithm, the present invention further provides an adaptive adjustment strategy for the upper bound M of memory size. The value of M may be appropriately adjusted according to a change trend of the optimal memory size found in several previous iterations (for example, previous seven iterations). The flowchart is shown in FIG. 4. A specific process is:

given a window size W, a predicted value $m_{f,t}^*$ of the memory size at the current iteration is calculated according to a formula $$m_{f,t}^* = \frac{m_{t-W}^* + m_{t-W+1}^* + \cdots + m_{t-1}^*}{W},$$

where $m_t^*$ denotes the optimal memory size at iteration t; and given constants $c_1$ and $c_2$, if $m_{f,t}^* < c_1 M$, M=M−1, if $m_{f,t}^* > (1-c_2)M$, M=M+1; or otherwise, M is kept unchanged.

Figure 5:
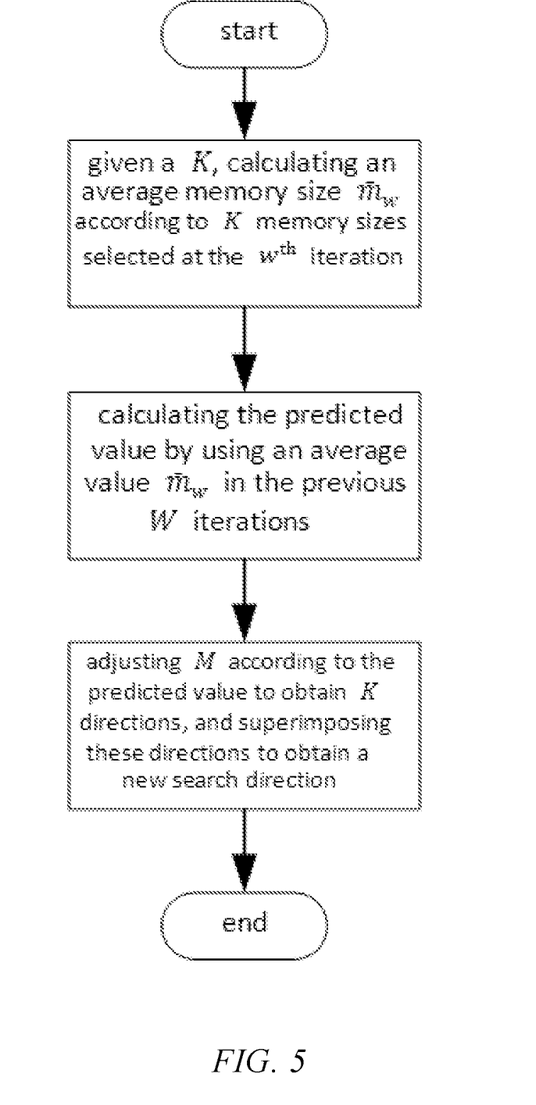
FIG. 5 is the flowchart of the construction of multiple directions in the method for designing a complex-valued channel equalizer according to the present invention.

To further improve the performance of the adaptive complex-valued L-BFGS algorithm, the present invention provides the design of a new search direction by superimposing a plurality of directions. At the $t^{th}$ iteration, a plurality of memory sizes (for example, $m_{t1}^*$, $m_{t2}^*$, ..., $m_{tK}^*$) are selected, so that a plurality of directions can be calculated, and then these directions are superimposed to obtain the search direction at the current iteration. The flowchart is shown in FIG. 5. A specific process is:

given a positive integer K, an average memory size is calculated according to K memory sizes $m_{w1}^*$, $m_{w2}^*$, ..., $m_{wK}^*$ selected in the $w^{th}$ iteration, $$\overline{m}_w = \frac{m_{w1}^* + m_{w2}^* + \cdots + m_{wK}^*}{K};$$

the predicted value $$m_{f,t}^* = \frac{\overline{m}_{t-W} + \overline{m}_{t-W+1} + \cdots + \overline{m}_{t-1}}{W}$$

of the memory size at the current iteration is calculated by using an average value $\overline{m}_w$ (w=t−W, t−W+1, ..., t−1) of memory sizes in the previous W iterations;

M is adjusted according to the predicted value by using the foregoing adaptive adjustment method; and K memory sizes at the $t^{th}$ iteration are calculated according to the modified M, to obtain K directions, and then these directions are superimposed to obtain the search direction at the current iteration.

The present invention constructs a complex-valued channel equalizer using a multi-layer feedforward complex-valued neural network and designs an adaptive complex-valued L-BFGS algorithm for implementing efficient learning of the model, to eventually implement channel equalization. For a given feedforward complex-valued neural network, $$\overset{c}{g}_t, \overset{c}{s}_t, \overset{c}{y}_t, \overset{c}{\gamma}_t, \text{ and } \overset{c}{\omega}_t$$

are first calculated by using forward propagation and backward propagation, appropriate M and the optimal memory size m* are calculated by using the foregoing method, the adjustment amounts of the weights and the bias of the feedforward complex-valued neural network are calculated through Wirtinger calculus, a step size is obtained by using a line search method, and efficient learning of the multi-layer feedforward complex-valued neural network is eventually implemented, to form a final channel equalizer.

Figure 6:
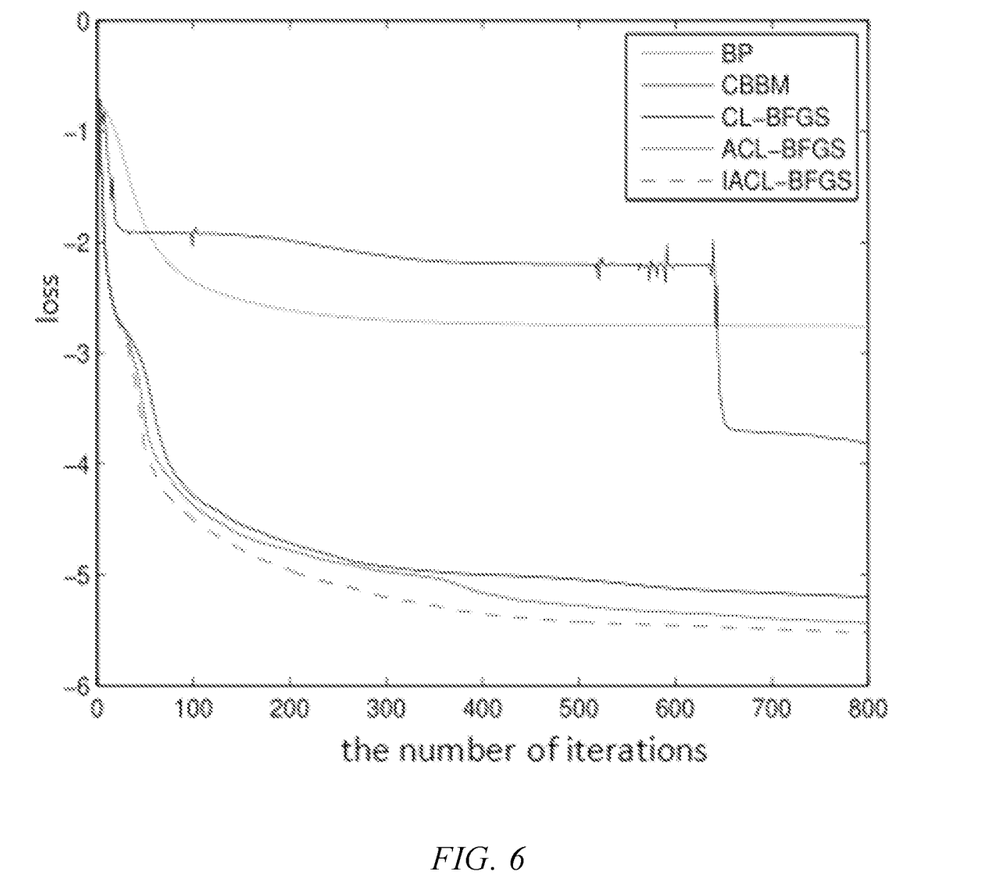
FIG. 6 is the schematic diagram of performance comparison of different methods for designing a complex-valued channel equalizer.

Referring to FIG. 6, it may be found that the present invention implements the design of a channel equalizer by constructing a complex-valued neural network, and the algorithm provided in the present invention can achieve better performance. The BP and CBBM algorithms are common complex-valued gradient-type algorithms. CL-BFGS is a conventional complex-valued L-BFGS algorithm. ACL-BFGS is an adaptive complex-valued L-BFGS algorithm in which a plurality of directions are not included. In an IACL-BFGS algorithm, a stack technique is used to select K best memory sizes and an average direction is calculated, which can achieve a better convergence.

The key ideas of the present invention are as follows:

An adaptive adjustment method of the optimal memory size in a complex-valued L-BFGS algorithm is established by considering the approximation degree between quasi-Newton matrix and Hessian matrix. A data prediction measure is used to estimate an upper bound of the memory size, to avoid unnecessary calculation, thereby reducing the computational complexity of the design of channel equalizer. A method is proposed to build a new search direction in a multidirectional superposition manner, thereby improving the performance of the adaptive complex-valued L-BFGS algorithm. By means of the algorithm provided in the present invention, efficient learning of multi-layer feedforward complex-valued neural networks can be implemented, thereby resolving the problem of channel equalization.

The adaptive complex-valued L-BFGS algorithm provided in the present invention resolves the problem of selecting the optimal memory size, thereby overcoming the instability phenomenon of the algorithm. Compared with a conventional complex-valued L-BFGS algorithm, the adaptive complex-valued L-BFGS algorithm provided in the present invention is significantly improved such that faster convergence and more accurate solution can be achieved. The adaptive complex-valued L-BFGS algorithm provided in the present invention avoids unnecessary calculation, and the computational complexity is greatly reduced. For the channel equalization problem, compared with previous algorithms, the presented algorithm can achieve better performance.

The foregoing embodiments are merely preferred embodiments used to fully describe the present invention, and the protection scope of the present invention is not limited thereto. Equivalent replacements or variations made by a person skilled in the art to the present invention all fall within the protection scope of the present invention. The protection scope of the present invention is as defined in the claims.

What is claimed is:

1. A method for designing a complex-valued channel equalizer, comprising:
   constructing a complex-valued channel equalizer by using a complex-valued neural network, wherein the complex-valued channel equalizer is applied to a digital communication system; collecting an output signal $y(n)=[y(n), y(n-1), \ldots, y(n-m+1)]^T$ of a nonlinear channel of the digital communication system as an input of complex-valued neural network and $s(n-\tau)$ as a corresponding desired output, and taking the mean squared error as the loss function $J(z,z^*)$; and optimizing the loss function $J(z,z^*)$ to obtain an appropriate complex-valued neural network model, and finally using the complex-valued neural network to implement channel equalization,
   wherein the "optimizing the loss function $J(z,z^*)$" specifically comprises: optimizing the loss function $J(z,z^*)$ by an adaptive complex-valued L-BFGS algorithm, in the adaptive complex-valued L-BFGS algorithm, calculating and comparing an approximation degree between the inverse of quasi-Newton matrix and the inverse of Hessian matrix along a particular vector, and selecting a memory size corresponding to the highest degree of approximation as the optimal memory size at the current iteration.

2. The method for designing a complex-valued channel equalizer according to claim 1, wherein in the digital communication system, a complex-valued digital sequence of the nonlinear channel is denoted by $s(n)$, a channel order is h, a channel mapping is $f(\bullet)$, a noiseless channel output is $\hat{y}(n)$, an additive noise is $v(n)$, an actual channel output $y(n)$ is a superposition result of the noiseless channel output and the additive noise and is taken as the input data of the equalizer, an equalizer order is m, and a decision delay of the equalizer is assumed to be $\tau$; a state ns of the channel is a data set generated by a limited character set transmitted through the channel, and a size of the data set is determined by the equalizer order and the channel order; a modulation order of a transmitted signal is M; and thus a transmission function of the channel is described by $$H(z) = \sum_{i=0}^{h} a_i z^{-i}$$

and a quantity of the state ns of the channel is determined by
ns $M^{h\,m}$,
in this case, an input sequence $s(n)=[s(n), \ldots, s(n-m 1-h)]^T$ has ns states, after transmission through a noiseless channel, a desired channel output $\hat{y}(n)$ also has ns states;
the equalizer is used to reconstruct a sequence transmitted by a transmit end according to an observed channel output vector $y(n)=[y(n), y(n-1), \ldots, y(n-m+1)]^T$ with additive noise, herein $y(n)=[y(n), y(n-1), \ldots, y(n-m+1)]^T$ is a distortion signal with m delays, and m is the equalizer order.

3. The method for designing a complex-valued channel equalizer according to claim 1, wherein a specific implementation process of "in the adaptive complex-valued L-BFGS algorithm, calculating and comparing the approximation degree between the inverse of quasi-Newton matrix and the inverse of Hessian matrix along a particular vector, and selecting a memory size corresponding to the highest degree of approximation as the optimal memory size at the current iteration" is as follows:

separately calculating $$\overset{c}{g}_t = [2\nabla_z * J(z,z^*)^T, 2\nabla_z J(z,z^*)^T]^T, \overset{c}{s}_t = \overset{c}{z}_t - \overset{c}{z}_{t-1}, \text{ and } \overset{c}{y}_t = \overset{c}{g}_t - \overset{c}{g}_{t-1}$$

according to the loss function $J(z,z^*)$, wherein $$\overset{c}{z}_t = (z_t, z_t^*)^T;$$

respectively calculating $$\overset{c}{\gamma}_t = \overset{c}{s}_t - \frac{1}{3}\overset{c}{s}_{t-1}$$

and $$\overset{c}{\omega}_t = \overset{c}{y}_t - \frac{1}{3}\overset{c}{y}_{t-1}$$

in a multi-step quasi-Newton formula by using $$\overset{c}{s}_y \text{ and } \overset{c}{y}_t;$$

according to the formula:

$$\hat{H}_t^m = (V_{t-2}^H \ldots V_{t-m}^H)\hat{H}_t^{m0}(V_{t-m} \ldots V_{t-2}) +$$
$$\overset{c}{\rho}_{t-m}(V_{t-2}^H \ldots V_{t-m+1}^H)\overset{c}{\gamma}_{t-m}\overset{cH}{\gamma}_{t-m}(V_{t-m+1} \ldots V_{t-2}) +$$
$$\overset{c}{\rho}_{t-m+1}(V_{t-2}^H \ldots V_{t-m+2}^H)\overset{c}{\gamma}_{t-m+1}\overset{cH}{\gamma}_{tm+1}(V_{t-m+2} \ldots V_{t-2})$$

calculating a matrix $\hat{H}_t^m$, which is the quasi-Newton matrix and is used to depict the approximation degree between the inverse of the quasi-Newton matrix and the inverse of Hessian matrix; herein, the superscript H denotes conjugate transpose, $$\overset{c}{\rho}_t = 1/\left(\overset{cH}{\omega}_t \overset{c}{\gamma}_t\right)$$

$$V_t = I - \overset{c}{\rho}_t \overset{c}{\omega}_t \overset{c}{\gamma}_t,$$

$$\hat{H}_t^{m0} = \frac{\overset{cH}{\omega}_{t-1}\overset{c}{\gamma}_{t-1}}{\overset{c}{\omega}_{t-1}\overset{c}{\omega}_{t-1}};$$

given an upper bound M of memory size, calculating the approximation degree between $\hat{H}_t^m$ and the inverse of Hessian matrix for $m=1, 2, \ldots, M$ according to a formula $$e_m = \left(\hat{H}_t^m \overset{c}{\omega}_t - \overset{c}{\gamma}_t\right)^H \left(\hat{H}_t^m \overset{c}{\omega}_t - \overset{c}{\gamma}_t\right);$$

based on the foregoing calculated $e_m$, selecting a corresponding value of m achieving the minimum of $e_m$ as the optimal memory size m* of the complex-valued L-BFGS algorithm;

when the optimal memory size is determined, calculating a search direction at the current iteration with the help of $$\hat{H}_t = (V_{t-1}^H \cdots V_{t-m}^H)\hat{H}_t^0(V_{t-m} \cdots V_{t-1}) +$$
$$\overset{c}{\rho}_{t-m}(V_{t-1}^H \cdots V_{t-m+1}^H)\overset{c}{s}_{t-m}\overset{cH}{s}_{t-m}(V_{t-m+1} \cdots V_{t-1}) +$$
$$\overset{c}{\rho}_{t-m+1}(V_{t-1}^H \cdots V_{t-m+2}^H)\overset{c}{s}_{t-m+1}\overset{cH}{s}_{t-m+1}(V_{t-m+2} \cdots V_{t-1}) + \cdots + \overset{c}{\rho}_{t-1}\overset{c}{s}_{t-1}\overset{cH}{s}_{t-1}$$

calculating a search direction by $$\overset{cT}{p}_t = -\hat{H}_t\overset{c}{g}_t;$$

and then, using a line search condition:

$$J\!\left(\overset{c}{z}_t + \alpha_t \overset{c}{p}_t\right) \leq J\!\left(\overset{c}{z}_t\right) + k_1\alpha_t\overset{c}{p}_t\frac{\partial J\!\left(\overset{c}{z}_t\right)}{\partial \overset{c}{z}_t}$$

$$\overset{cT}{p}_t\frac{\partial J\!\left(\overset{c}{z}_t + \alpha_t \overset{c}{p}_t\right)}{\partial \overset{c}{z}_t} \geq k_2\overset{cT}{p}_t\frac{\partial J\!\left(\overset{c}{z}_t\right)}{\partial \overset{c}{z}_t}$$

calculating a step size, wherein $k_1$ takes value from the interval $(0,0.5)$, and $k_2$ takes value from the interval $(k_1, 1)$, to obtain a parameter update formula as $$\overset{c}{z}_t = \overset{c}{z}_{t-1} + \alpha_t \overset{cT}{p}_t.$$

4. The method for designing a complex-valued channel equalizer according to claim 3, wherein a specific process of "appropriately adjusting the value of M according to a change trend of the optimal memory size selected in several previous iterations" comprises:

given a window size W, calculating a predicted value $m_{f,t}^*$ of the memory size at the current iteration according to a formula $$m_{f,t}^* = \frac{m_{t-W}^* + m_{t-W+1}^* + \cdots + m_{t-1}^*}{W},$$

wherein $m_t^*$ denotes the optimal memory size at iteration t; and given constants $c_1$ and $c_2$, if $m_{f,t}^* < c_1 M$, M=M−1; if $m_{f,t}^* > (1−c_2)M$, M=M+1; or otherwise, M is kept unchanged.

5. The method for designing a complex-valued channel equalizer according to claim 3, wherein a new search direction is designed by superimposing a plurality of directions, at the $t^{th}$ iteration, multiple memory sizes can be selected, so that a plurality of directions are calculated, and then these directions are superimposed to obtain the search direction at the current iteration.

6. The method for designing a complex-valued channel equalizer according to claim 5, wherein a specific process "a new search direction is designed by superimposing a plurality of directions, at the $t^{th}$ iteration, multiple memory sizes can be selected, so that a plurality of directions are calculated, and then these directions are superimposed to obtain the search direction at the current iteration" is:

given a positive integer K, calculating an average memory size according to K memory sizes $m_{w1}^*, m_{w2}^*, \ldots, m_{wK}^*$ selected at the $w^{th}$ iteration, $$\overline{m}_w = \frac{m_{w1}^* + m_{w2}^* + \cdots + m_{wK}^*}{K},$$

calculating the predicted value $$m_{f,t}^* = \frac{\overline{m}_{t-W} + \overline{m}_{t-W+1} + \cdots + \overline{m}_{t-1}}{W}$$

of the memory size at the current iteration by using an average value $\overline{m}_W$ (w=t−W, t−W+1, . . . , t−1) of memory sizes in the previous W iterations;

adjusting M according to the predicted value by using the foregoing adaptive adjustment method; and calculating K memory sizes at the $t^{th}$ iteration according to the modified M, to obtain K directions, and then superimposing these directions to obtain the search direction at the current iteration.

7. A computer device, comprising: a memory, a processor, and a computer program stored in the memory and configured to be executed by the processor, wherein the processor is configured to execute the program to implement the steps in the method according to claim 1.

8. A processor, configured to execute a program, wherein the program is executed to implement the method according to claim 1.

* * * * *